United States Patent
Krishnan et al.

(10) Patent No.: US 7,480,301 B2
(45) Date of Patent: Jan. 20, 2009

(54) METHOD, SYSTEM AND ARTICLE FOR IMPROVED TCP PERFORMANCE DURING RETRANSMISSION IN RESPONSE TO SELECTIVE ACKNOWLEDGEMENT

(75) Inventors: Uma Krishnan, Austin, TX (US); Venkat Venkatsubra, Austin, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 11/014,540

(22) Filed: Dec. 16, 2004

(65) Prior Publication Data

US 2006/0133379 A1    Jun. 22, 2006

(51) Int. Cl.
- H04L 1/00 (2006.01)
- H04L 12/26 (2006.01)
- H04J 3/14 (2006.01)
- H04J 1/16 (2006.01)

(52) U.S. Cl. .................................... 370/394
(58) Field of Classification Search ............... 370/394, 370/229, 231, 473, 474, 352, 278, 412, 316, 370/466, 400, 338, 401, 227, 252; 709/237, 709/236
See application file for complete search history.

(56) References Cited

U.S. PATENT DOCUMENTS

| | | | |
|---|---|---|---|
| 7,089,312 B2 * | 8/2006 | Liu et al. ................. | 709/227 |
| 7,283,469 B2 * | 10/2007 | Swami ...................... | 370/229 |
| 7,315,515 B2 * | 1/2008 | Pazos ....................... | 370/231 |
| 2002/0054570 A1 * | 5/2002 | Takeda ...................... | 370/252 |
| 2003/0055980 A1 * | 3/2003 | Liu et al. .................. | 709/227 |
| 2003/0123481 A1 * | 7/2003 | Neale et al. ................ | 370/466 |
| 2004/0165538 A1 * | 8/2004 | Swami ....................... | 370/252 |
| 2005/0149632 A1 * | 7/2005 | Minami et al. .............. | 709/237 |
| 2005/0286527 A1 * | 12/2005 | Tieu et al. .................. | 370/394 |
| 2007/0206615 A1 * | 9/2007 | Plamondon et al. ......... | 370/401 |

OTHER PUBLICATIONS

M. Mathis, et al. TCP Selective Acknowledgement Options, RFC 2018 (RFC2018), http:/www.faqs.org/rfcs/rfc2018.html, Oct. 15, 2004.

Baratakke, et al., Method, System and Article for Improved TCP Performance During Packet Reordering, U.S. Appl. No. 10/640,818, filed Aug. 14, 2003.

Banerjee, et al., Method and Apparatus for Handling Reordered Data Packets, U.S. Appl. No. 10/777,723, filed Feb. 12, 2004.

Baratakke, et al., Method and Apparatus for Providing Fragmentation at a Transport Level Along a Transmission Path, U.S. Appl. No. 10/897,354, filed Jul. 22, 2004.

\* cited by examiner

*Primary Examiner*—Wing F Chan
*Assistant Examiner*—Prenell P Jones
(74) *Attorney, Agent, or Firm*—Matthew W. Baca; Dillon & Yudell LLP

(57) ABSTRACT

A TCP/IP retransmission frame contains multiple TCP segments containing non-contiguous missing packets from a data communication. A TCP option in the first segment in the frame indicates the presence of multiple TCP payloads in the frame. Each TCP payload has a corresponding prepended TCP header. An offset address specified in each TCP header within the frame identifies the location of the next TCP header in the frame. Network throughput performance is enhanced by permitting multiple non-contiguous packets to be retransmitted in a single IP packet.

6 Claims, 9 Drawing Sheets

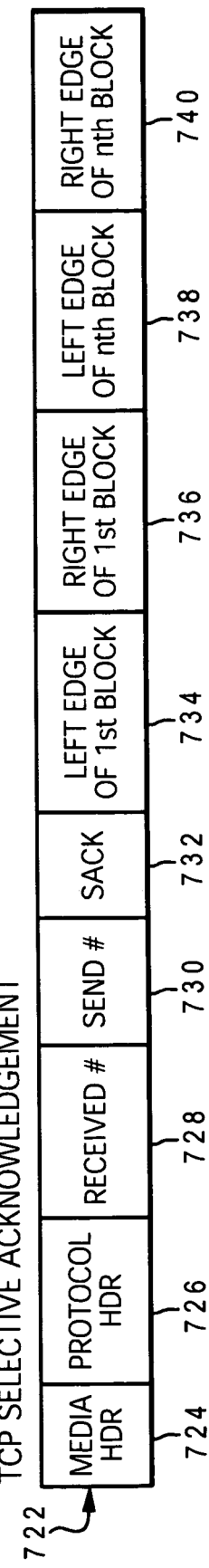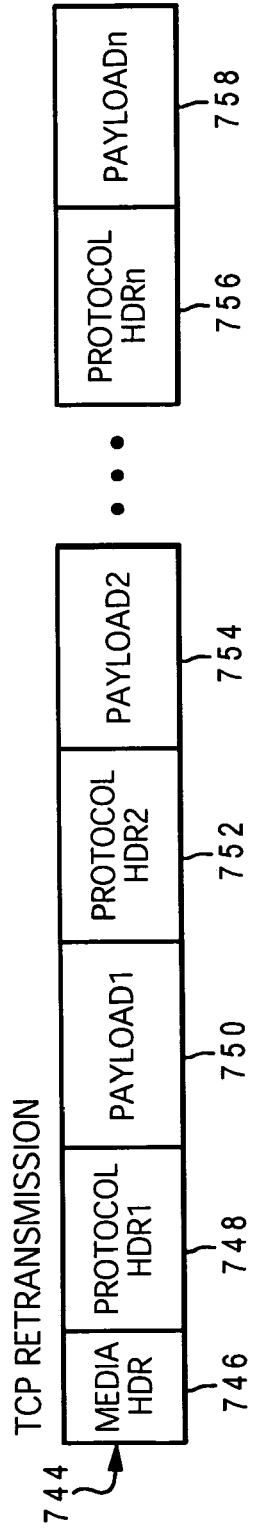

METHOD, SYSTEM AND ARTICLE FOR IMPROVED TCP PERFORMANCE DURING RETRANSMISSION IN RESPONSE TO SELECTIVE ACKNOWLEDGEMENT

BACKGROUND OF THE INVENTION

1. Field of the Invention

The present invention relates generally to data transfers in data processing network systems, and in particular to transfer of data blocks over the Internet and similar networks. Still more particularly, the present invention relates to improved TCP network communications during retransmission.

2. Description of the Related Art

The Internet has become an important conduit for transmission and distribution of data (text, code, image, video, audio, or mixed) and software. Users connect to the backbone with broadly divergent levels of performance, ranging from 14.4 Kb/s to more than 45 Mb/s. Moreover, Transmission Control Protocol/Internet Protocol (TCP/IP) has become a widely implemented standard communication protocol in Internet and Intranet technology, enabling broad heterogeneity between clients, servers, and the communications systems coupling them. Transmission Control Protocol (TCP) is the transport layer protocol and Internet Protocol (IP) is the network layer protocol. TCP builds a connection oriented transport level service to provide guaranteed, sequential delivery of a byte stream between two IP hosts. Application data is sent to TCP, broken into segments sequenced by segment numbers, and packetized into TCP packets before being sent to IP. IP provides a "datagram" delivery service at the network level. Reliability in data transmission can be compromised by three events: data loss, data corruption, and reordering of data.

Data loss is managed in TCP/IP by a time-out mechanism. TCP maintains a timer (retransmission timer) to measure the delay in receiving an acknowledgment (ACK) of a transmitted segment from the receiver. When an ACK does not arrive within an estimated time interval (retransmission time-out (RTO)), the corresponding segment is assumed to be lost and is retransmitted. Further, because TCP is traditionally based on the premise that packet loss is an indication of network congestion, TCP will back-off its transmission rate by entering "slow-start," thereby drastically decreasing its congestion window to one segment.

TCP manages data corruption by performing a checksum on segments as they arrive at the receiver. On checksum, the TCP sender computes the checksum on the packet data and puts this 2-byte value on the TCP header. The checksum algorithm is a 16-bit one's complement of a one's complement sum of all 16-bit words in the TCP header and data. The receiver computes the checksum on the received data (excluding the 2-byte checksum field in the TCP header) and verifies that it matches the checksum value in the header. The checksum field also includes a 12-byte pseudo header that contains information from the IP header (including a 4-byte "src ip" address, 4-byte "dest ip" address, 2-byte payload length, 1-byte protocol field).

TCP manages reordering of data or out-of-order arrival of segments by maintaining a reassembly queue that queues incoming packets until they are rearranged in sequence. Only when data in this queue gets in sequence is it moved to the user's receive buffer where it can be seen by the user. When the receiver observes a "hole" in the sequence numbers of packets received, the receiver generates a duplicate acknowledgement (DACK) for every "out-of-order" packet it receives. Until the missing packet is received, each received data packet with a higher sequence number is considered to be "out-of-order" and will cause a DACK to be generated.

Packet reordering is a common occurrence in TCP networks given the prevalence of parallel links and other causes of packet reordering. For instance, on Ether-channel® provided by Cisco Systems, Inc., a number of real adapters are aggregated to form a logical adapter, whereby packet reordering is commonly caused when packets are sent in parallel over these multiple adapters. In TCP, any data packets following one that has been lost or reordered are queued at the receiver until the missing packet arrives. The receiver then acknowledges all the queued packets together.

Because TCP will wrongly infer that network congestion has caused a packet loss after the sender receives a few DACKs, some TCP implementations have adopted a "fast retransmit and recovery" algorithm to improve network performance in the event packet reordering occurs. The "fast retransmit and recovery" algorithm is generally intended to improve TCP throughput by avoiding a time-out, which results in the dramatic reduction of the congestion window to one segment. Instead of timing out, fast retransmit cuts the congestion window in half in response to reordering.

Although fast retransmit does provide some protection against throughput reduction caused by congestion control mechanisms, multiple packet losses can have a catastrophic effect on TCP throughput. TCP is generally a cumulative acknowledgment scheme in which received segments not at the edge of the receive window are not explicitly acknowledged. This forces the sender to either wait for a round trip time to find out about each lost packet, or to unnecessarily retransmit segments that have been correctly received. Selective Acknowledgement (SACK) is a TCP mechanism devised to overcome this problem. SACK permits the data receiver to inform the sender about all segments that have arrived successfully, so the sender need retransmit only the segments that have actually been lost. Moreover, a single SACK lets a data receiver report multiple blocks of missing data to the sender.

While SACK has been effective in reducing the unnecessary retransmissions, its use creates its own inefficiencies. For example, when the size of the packets of the original transmission that were lost are much smaller than the Maximum Segment Size (MSS) of the TCP connection (for instance when TCPs Nagle algorithm for data coalescing at the transport layer is turned off by the application), and the holes created by the missing packets are small (i.e., the packets dropped are not contiguous), the retransmissions will be sent with data less than the MSS because a TCP segment can contain only contiguous data. Thus, in the example where multiple noncontiguous packets are to be retransmitted in response to a SACK, the TCP payloads of the retransmissions will contain the small packets, leaving the remaining portion of the MSS unused, even though the sender has data exceeding the MSS to resend. This forces the sender to send multiple IP packets of under-utilized payload space in response to SACKs. As will be appreciated, this will cause a negative impact on performance by increasing network traffic and IP/TCP processing at both the sender and receiver.

This problem is demonstrated in the example shown in FIGS. 9A and 9B. FIG. 9A shows a series of contiguous packets A1-A4 transmitted from a sender to a receiver. In this exemplary system, each of the packets of the original transmission are 4096 bytes, but the MSS for the TCP connection is 60 K bytes, so the receiver receives all four packets in a single IP packet. Now suppose due to data loss in the connection, the receiver has not received packets A2 and A4, and consequently has SACKed packets A1 and A3. The sender will send a first IP packet containing a payload B1, which is the retransmission of A2. Although the MSS of the IP payload is 60 K bytes, the packet only includes 4096 bytes of contiguous data contained in A2. The sender then sends a second IP packet containing a payload B2 of 4096 bytes, which is the retransmission of packet A4. As can be seen, even though the MSS is 60 K bytes for each IP packet, two IP packets are required to be transmitted to retransmit 8192 bytes in response to the SACK. As can be seen, it would be desirable to reduce this negative impact on throughput when performing retransmissions in response to a SACK.

SUMMARY OF THE INVENTION

In accordance with the present invention, improved methods, systems and articles of manufacture for retransmitting missing packets in a data communication are disclosed. One preferred method of the present invention comprises the steps of receiving an acknowledgement message from a receiver indicating two or more packets within the data communication were not received; and generating a retransmission message to retransmit the two or more packets within the data communication indicated in the message as not received, wherein the retransmission message contains the two or more packets and two or more protocol headers, and each of the two or more protocol headers is associated with a corresponding one of the two or more packets, and wherein the two or more protocol headers are the same protocol.

Another preferred method of the present invention for receiving missing packets in a data communication comprises receiving a retransmission message from a sender containing two or more packets within the data communication previously indicated as not received; determining if the retransmission message contains the two or more packets and two or more protocol headers, wherein each of the two or more protocol headers is associated with a corresponding one of the two or more packets, and wherein the two or more protocol headers are the same protocol; extracting a first packet of the two or more packets in accordance with its corresponding protocol header; and extracting a second packet of the two or more packets in accordance with its corresponding protocol header.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows:

FIG. 7A shows the data structure of a TCP selective acknowledge frame, in accordance with a preferred embodiment of the present invention.

FIG. 7B shows the data structure of a TCP retransmission frame, in accordance with a preferred embodiment of the present invention.

DETAILED DESCRIPTION OF PREFERRED EMBODIMENTS

Figure 1:
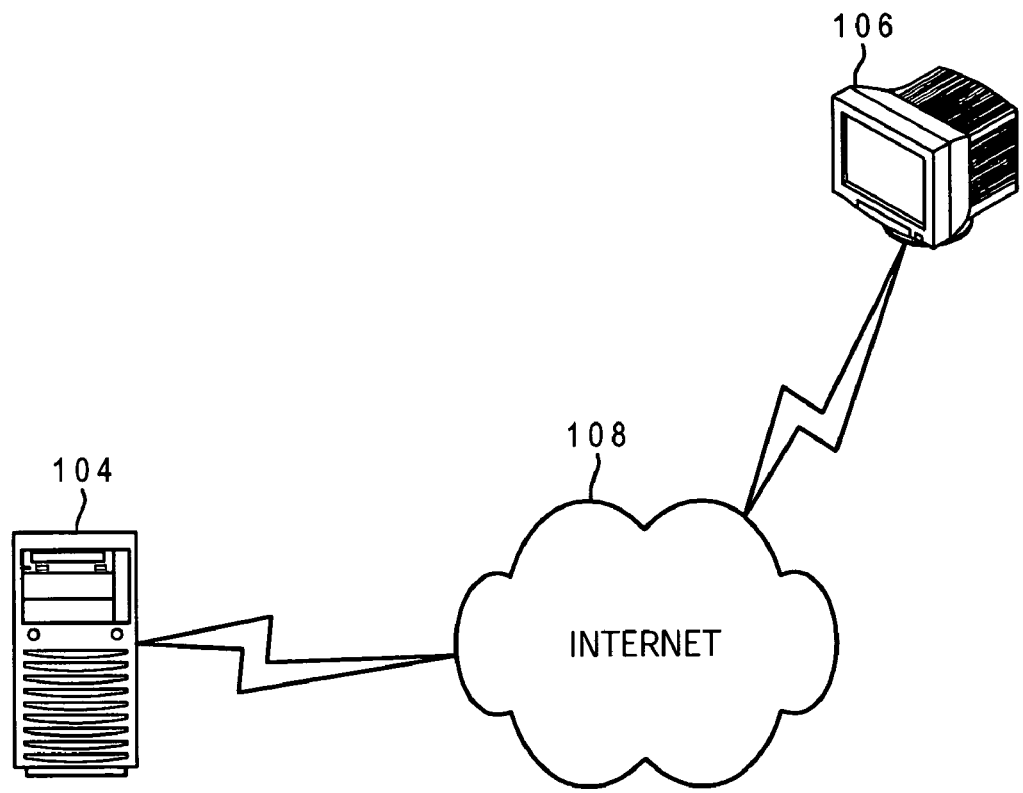
FIG. 1 shows a data processing system network in which a preferred embodiment of the present invention may be implemented is depicted.

With reference now to the figures, and in particular with reference to FIG. 1, a data processing system network in which a preferred embodiment of the present invention may be implemented is depicted. Data processing system network 102 includes at least one server system 104 coupled to at least one client system 106 via at least one network such as the Internet 108. Data transfers between the server system 104 and client system 106 conform to the TCP/IP specification, as well as File Transfer Protocol (FTP), HyperText Transfer Protocol (HTTP), or some similar communications protocol. As will be appreciated, while only a single server system 104 and single client system 106 are shown, data processing system network 102 may include any number of server and client systems (not shown) interconnected by one or more connections and networks, including Internet 108. For illustrative purposes, server system 104 and client system 106 communicate using TCP/IP, although the present invention is not limited as such, and that, in alternative embodiments, other suitable protocols may also be employed.

In order to transfer data over a network, it is necessary to have a set of rules so that every portion of the transfer sequence is properly executed. Each of these rules is called a protocol, and a set of rules is called a protocol suite. The most common set of protocols that are used when transferring data over the Internet and various other networks such as LANs (local area networks) and WANs (wide area networks) is provided by the TCP/IP (Transmission Control Protocol/Internet Protocol) protocol suite. The TCP/IP protocol suite allows a variety of different types of computers, running different operating systems, to communicate with each other. TCP/IP forms the basis for the worldwide Internet, a wide area network of more than one million computers that literally spans the globe. In the TCP/IP protocol suite, the network layer, IP, provides an unreliable service. It moves a packet of data from a source to a destination, but it provides no mechanism for guaranteeing delivery, or even being able to determine if a proper transfer has occurred. TCP provides reliability services to ensure that data is properly transmitted between two hosts, including dropout detection and retransmission services.

There are many other network protocol suites in addition to the TCP/IP suite, including IPX/SPX (Internet Packet Exchange/Sequenced Packet Exchange), and NetBios. Although originally developed by independent research groups, most network protocols are open (non-proprietary) standards, many of which are published as a series of numerically-ordered RFC (Request for Comment) papers. For example the IP protocol is RFC 791. The RFC papers are readily available on the Internet or at a various libraries. Although distinct, each of these network protocol suites are similar in structure, comprising a set of layers, with each layer responsible for a different facet of the communication task. For simplicity, the discussion below will primarily pertain to the use of the invention when using the TCP/IP protocol. However, it should be recognized by those skilled in the art that although the principles of the invention are described in reference to the TCP/IP protocol, the invention may also be applied to various other network protocols as well.

Flow control is the procedure of handling the mismatch in processing and buffering capacities between a receiver and a transmitter to best utilize the bandwidth provided by the transmission medium. TCP flow control mechanisms operate exclusively at the end stations to limit the rate at which TCP endpoints emit data. However, TCP lacks explicit data rate control. The basic flow control mechanism is a "sliding window", superimposed on a range of bytes beyond the last explicitly acknowledged byte. The sliding window limits the maximum number of sequential bytes between the byte most recently sent from the server to the earliest byte for which a receipt acknowledgment has not yet been received from the client. This sliding operation limits the amount of unacknowledged transmissible data that a TCP endpoint can emit. A receiving host, during the connection setup phase, informs the transmitting host its buffer capacity relating to the "maximum" number of packets that can be outstanding (unacknowledged) at any given time. This is the receiver or sliding window size, rwnd. The transmitter maintains a transmission window whose current size, wnd, is an estimate of how many packets can be pumped into the network without waiting for an acknowledgment (ACK). An upper bound on wnd is rwnd.

A variety of algorithms automatically re-send packets and slowly restart data transmission when the sliding window limit is exceeded. Thus, if the link between the server and client is shut down in the middle of transmission of a data collection, the server will stop sending packets within one sliding window of the last packet acknowledged by the client. This use of a sliding window inherently limits the bandwidth of a data transfer through the network.

Figure 2:
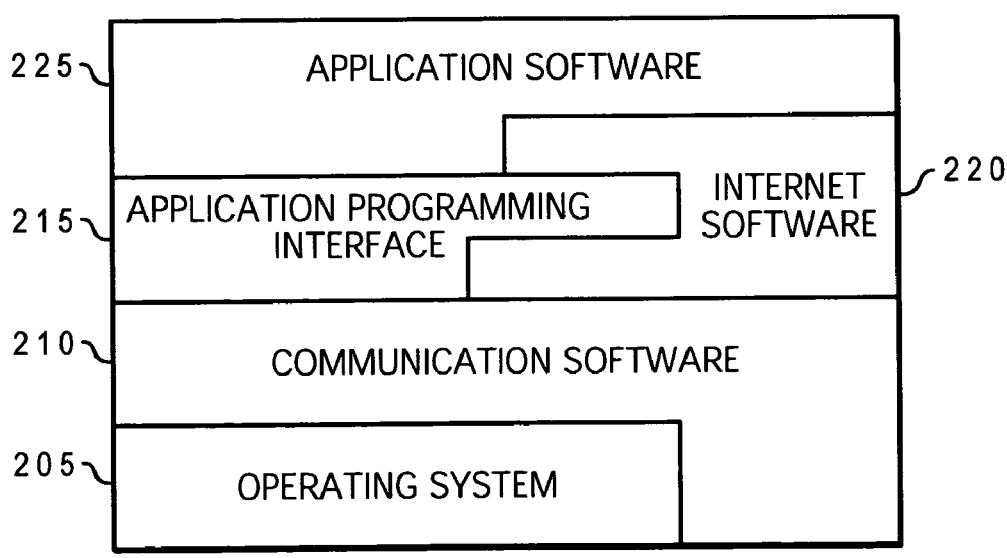
FIG. 2 is a depiction of a typical software architecture for a server-client system, as may be utilized in a preferred embodiment of the present invention.

FIG. 2 is a depiction of a typical software architecture for a server-client system, as may be utilized in a preferred embodiment of the present invention. Server 104 and client 106 are each architected with software architecture 200. At the lowest level, an operating system 205 is utilized to provide high-level functionality to the user and to other software. Such an operating system typically includes a BIOS (Basic Input Output System). Communication software 210 provides communications through an external port to a network such as the Internet via a physical communication link by either directly invoking operating system functionality or indirectly, bypassing the operating system to access the hardware for communications over the network. The application programming interface 215 allows the user of the system, be it an individual or a software routine, to invoke system capabilities using a standard consistent interface without concern for how the particular functionality is implemented. The Internet software 220 represents any one of several standard commercial packages available for equipping a computer with Internet functionality. The application software 225 represents any number of software applications designed to react to data through the communications port to provide the desired functionality the user seeks. Applications at this level may include those necessary to handle data, video, graphics, photos or text, which can be accessed by users of the Internet.

Figure 3:
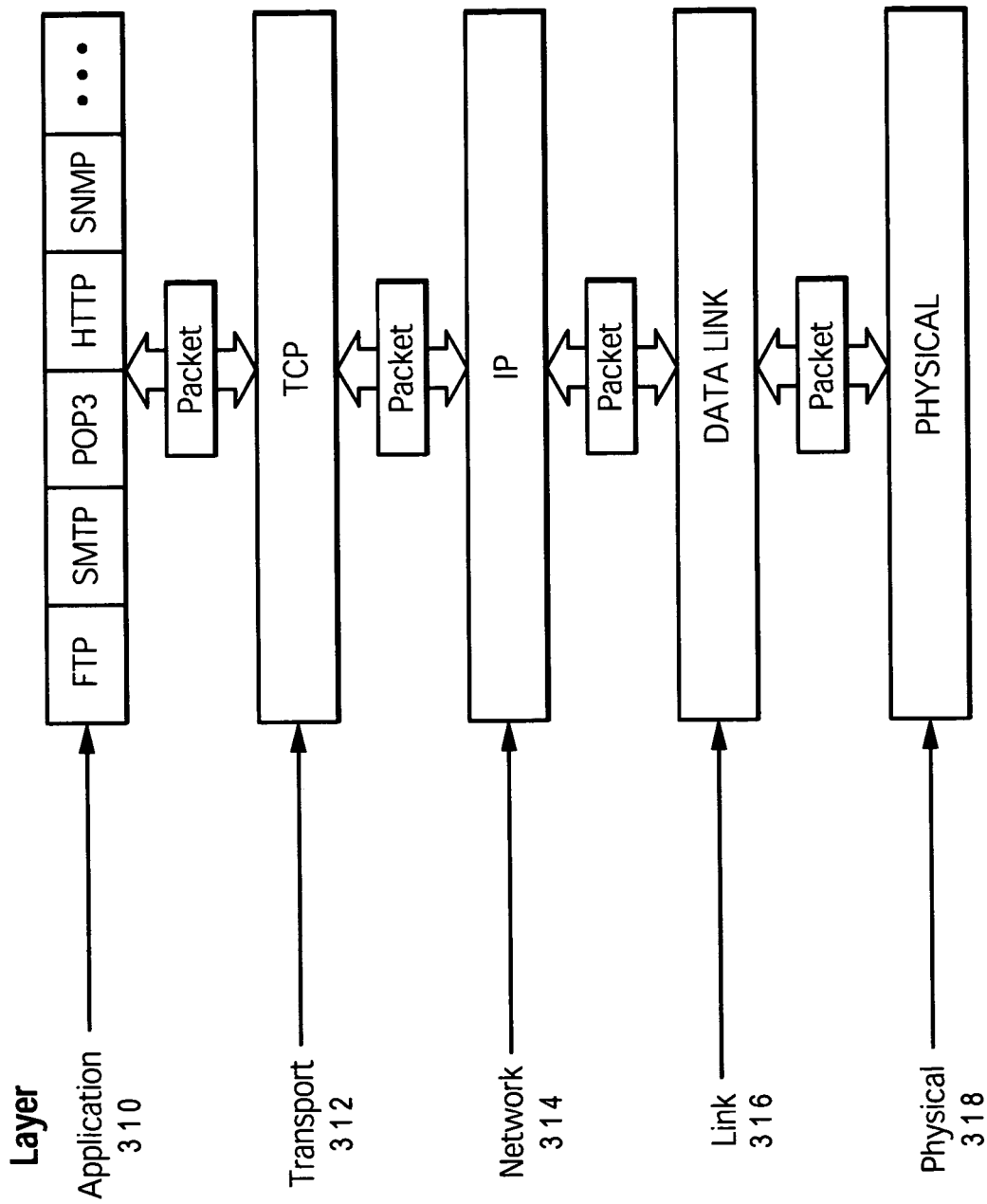
FIG. 3 shows an example of a 4-layer communications architecture utilizing TCP/IP.

As shown in FIG. 3, TCP/IP and similar protocols are utilized by a 4-layer communications architecture for the network comprising an application layer 310, a transport layer 312, a network layer 314, a link layer 316 and a physical layer 318. Each layer is responsible for handling various communications tasks, as follows.

Physical layer 318 generally transforms data into bits for communication between the various physical devices in the network. Examples of protocols employed in the physical layer may include, but are not limited to, protocols from the network interface card, such as an Ethernet card, token ring card, wireless network card, and the like. The Institute Of Electrical and Electronics Engineers (IEEE) has promulgated a variety of protocols that may be employed in the physical layer, protocols such as IEEE 802.3 Standard (Ethernet), IEEE 802.5 Standard (Token Ring), and IEEE 802.11 Standard (Wireless Ethernet).

Link layer 316 generally manages the data that is communicated over the network. Link layer 316 (also referred to as the data-link layer or the network interface layer) normally includes the device drivers and may include protocols such as Media Access Control (MAC), for example. Together, the physical and link layers handle all the hardware details of physically interfacing with the network media being used.

The network layer 314 (also referred to as the internet layer) handles the movement of packets of data around the network. For example, the network layer handles the routing of the various packets of data that are transferred over the network. The network layer in the TCP/IP suite is comprised of several protocols, including IP (Internet Protocol), ICMP (Internet Control Message Protocol), and IGMP (Internet Group Management Protocol).

The transport layer 312 provides an interface between the network layer 314 and the application layer 310 that facilitates the transfer of data between two host computers. The transport layer is concerned with things such as dividing the data passed to it from the application into appropriately sized chunks for the network layer below, acknowledging received packets, setting timeouts to make certain the other end acknowledges packets that are sent, etc. In the TCP/IP protocol suite there are two distinctly different transport protocols: TCP (Transmission Control Protocol) and UDP (User Datagram Protocol). TCP provides reliability services to ensure that data is properly transmitted between two hosts, including dropout detection and retransmission services. Conversely, UDP provides a much simpler service to the application layer by merely sending packets of data called datagrams from one host to the other, without providing any mechanism for guaranteeing that the data is properly transferred. When using UDP, the application layer must perform the reliability functionality.

The application layer 310 handles the details of the particular application. There are many common TCP/IP applications that almost every implementation provides, including (1) Telnet for remote login; (2) FTP, the File Transfer Protocol; (3) SMTP, the Simple Mail Transfer Protocol, for electronic mail, (4) SNMP, the Simple Network Management Protocol, and (5) Post Office Protocol, v3 (POP3).

Figure 4:
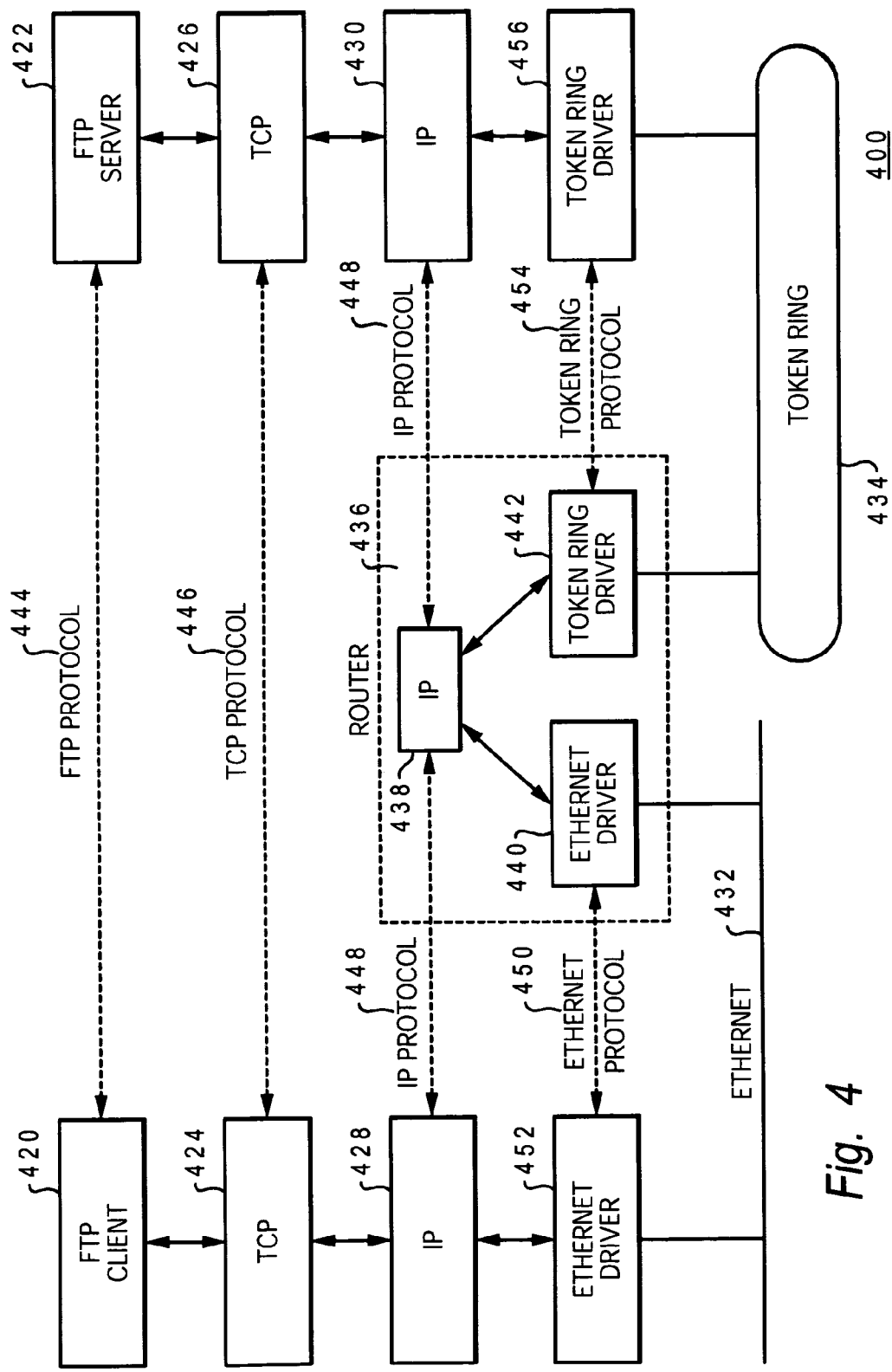
FIG. 4 shows an example of an internet comprising an Ethernet network connected to a token ring network by a router.

Networks such as the Internet are interconnected by routers, which each connect two or more networks together. Typical routers comprise a special-purpose hardware box with input and output connections and dedicated hardware and/or embedded software that allow many different types of physical networks to be connected, such as Ethernet, token ring, point-to-point links, etc. FIG. 4 shows an internet 400 comprising an Ethernet network 432 connected to a token ring network 434 by a router 436. Although FIG. 4 only shows two hosts in communication, any host on the Ethernet network can communicate with any host thereon, or with any host on the token ring network, and vice versa.

As shown in FIG. 4, the router 436 comprises a network layer module 438 (an IP module in this case), and appropriate network drivers for connecting to the host networks, namely an Ethernet driver 440 and a token ring driver 442. At the application layer, the network comprises an FTP client 420 and a FTP server 422; at the transport layer, the network comprises an TCP client 424 and a TCP server 426; and at the network layer, the network comprises an IP client 428 and a IP server 430. Most network applications are designed so that one end is the client and the other side is the server. The server provides some type of services to various clients, in this case, access to files on the server host. Each layer has one or more protocols for communicating with its peer at the same layer. These communication protocols include the FTP protocol 444 at the application layer, the TCP protocol 446 at the transport layer, the IP protocol 448 at the network layer, and the Ethernet protocol 450 and token ring protocol 454 at the link layer. It is common for the application layer to handle user processes, while the lower three layers (transport, network and link) are implemented in the kernel of the operating system, such as UNIX or Windows operating system. For example, the purpose of the network interface layer is to handle the details of the communication media (Ethernet, token ring, etc.), while the purpose of the application layer is to handle one specific user application (FTP, Telnet, etc.).

The application layer and the transport layer use end-to-end protocols (FTP protocol 444, TCP protocol 446). The network layer provides a hop-to-hop protocol that is used on the two end systems and every intermediate system in between (for clarity only one intermediate system is shown here). For instance, the IP module 438 of the router 436 is connected to the two hosts by IP protocols 448. There are also link layer protocols that are specific to the various types of host networks that are connected to the router to handle communication between the networks and the router at the link layer. Thus, an Ethernet protocol 450 is used to handle communications between the Ethernet driver 440 in the router 436 and the Ethernet driver 452 of the hosts on the Ethernet network 432, while a token ring protocol 454 is used to handle communications between the token ring driver 442 of the router 436 and the token ring driver 456 of the hosts on the token ring network 434.

Figure 5:
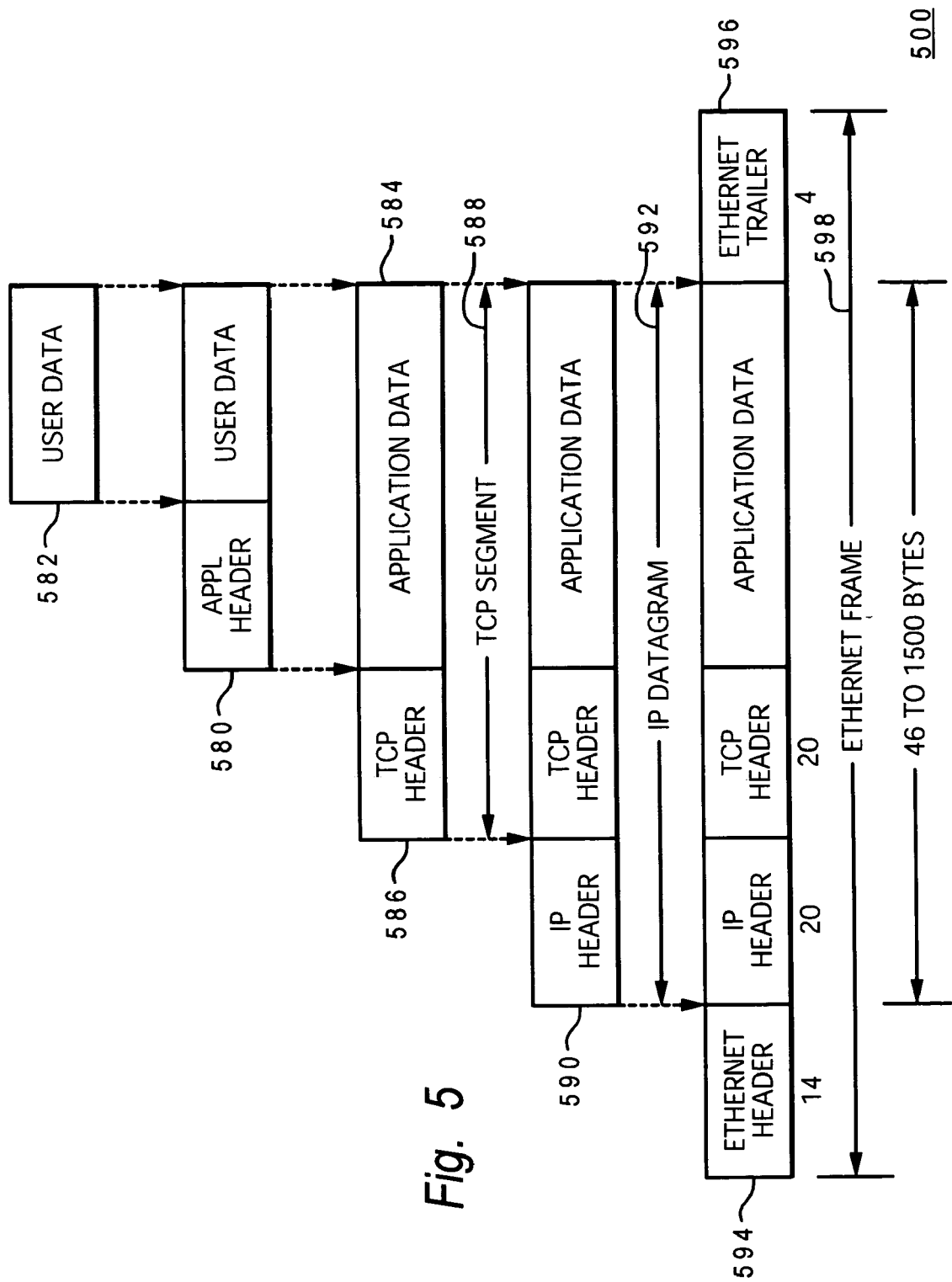
FIG. 5 shows the format of data as it traverses the TCP/IP protocol stack.

When an application sends data using TCP/IP, the data is sent down a protocol stack, through each layer, until it is sent out as a stream of bits across the network. As shown in FIG. 5, each layer adds information to the data by prepending headers (and sometimes adding trailer information) to the data that it receives. For instance, at the application layer an application header 580 is prepended to user data 582 to form application data 584. At the transport layer a transport protocol header is prepended to the application data. In the case of FIG. 5 the transport layer is TCP, and therefore a TCP header 586 is prepended to the application data 584, thereby forming a TCP frame 588 that is sent to the network layer IP. The TCP header 586 comprises twenty bytes. Similarly, at the network layer, a network layer header is prepended to the transport layer data. In the case of TCP/IP, an IP header 590 is prepended to the TCP frame 588 to form an IP datagram 592. The IP header 590 also comprises twenty bytes. Finally, at the link layer a media header such as Ethernet header 594 is added to the data received from the network layer to form a frame of data. In some instances, such as when the media is Ethernet, a media trailer is also appended to the end of the data. For instance, in FIG. 5 an Ethernet trailer 96 is appended to the Ethernet Header 594 and the IP datagram 592 to form an Ethernet frame 598. The Ethernet frame comprises the stream of bits that flow across the network that correspond to the original application message data. The numbers (14, 20, 20, 4) at the bottom of the headers are typical sizes of the headers in bytes, e.g., the Ethernet header 94 comprises 14 bytes, etc. The size of the frame will be limited by the maximum transmission unit (MTU) of the type of network being used to transfer the data packet. For example, the MTU of an Ethernet network is 1500 bytes. The network layer automatically performs fragmentation (breaking the datagram up into smaller pieces), so that each fragment is smaller than the MTU of the network.

Figure 6:
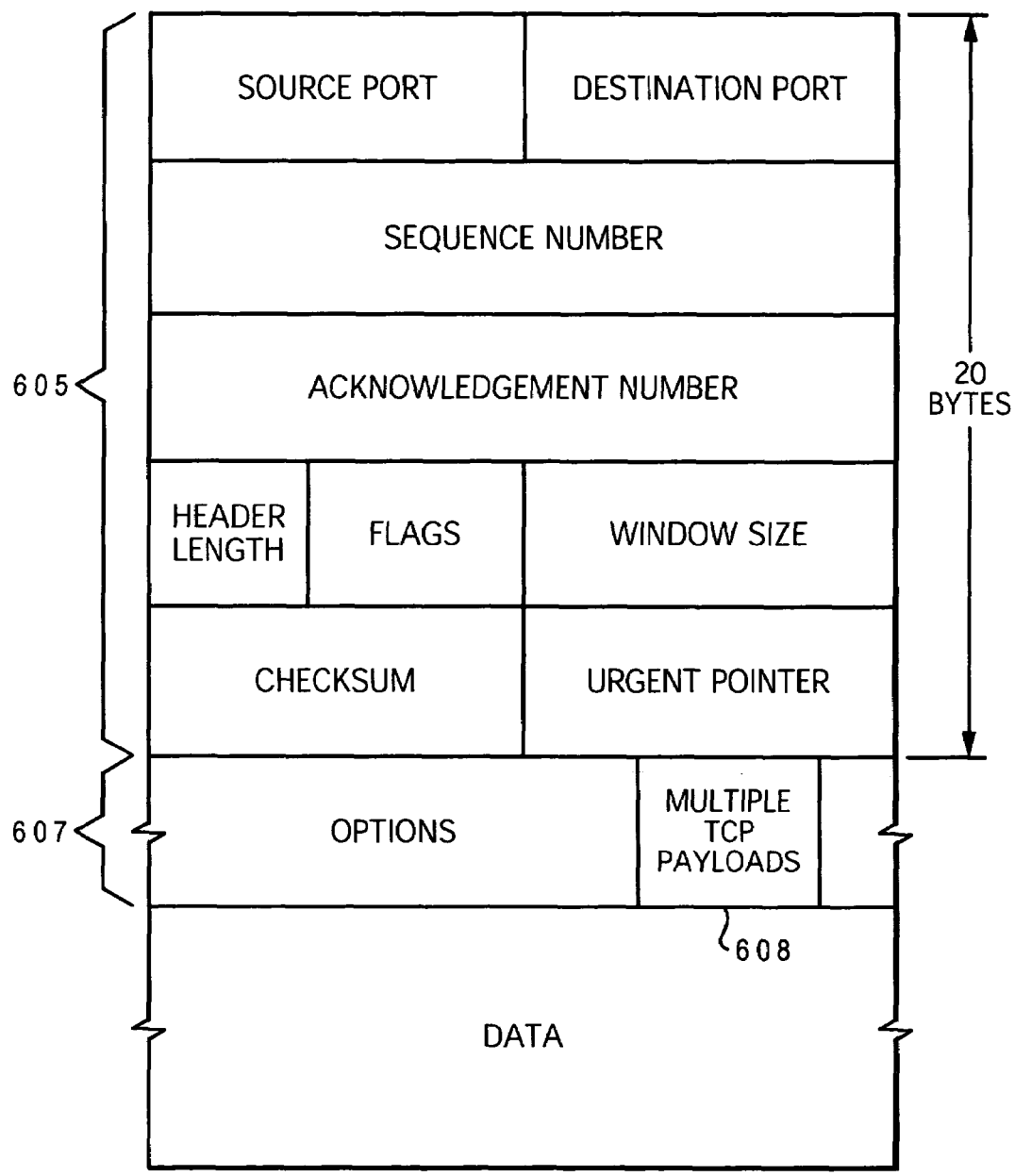
FIG. 6 shows the format for a TCP header, in accordance with a preferred embodiment of the present invention.

The format for a TCP header is shown in FIG. 6. As seen, a TCP packet 600 is constructed from 32-bit words and includes a 20 byte (5-word) header. The basic layout of the TCP header 605 includes:

"source port number"—The source (and destination) port numbers are used for demultiplexing the data stream to applications. It is entirely possible for there to be multiple simultaneous TCP data streams between two hosts. A TCP data stream is uniquely identified by a group of four numbers. These are the two hosts addresses and the two port numbers. The source port number is the one to be used as destination in any reply to the packet.

"destination port number"—This is the "target" port number on the remote system.

"sequence number"—This 32 bit number identifies the first byte of the data in the packet.

"acknowledgment number"—This 32 bit number is the byte number of the next byte that the sender host expects to receive from the remote host. The remote host can infer that all bytes up to this number minus one have been safely received and the remote host's local copies can be discarded.

"header length"—This 4-bit field specifies the header length in 32 bit words. Clearly the maximum value is 15 words (60 bytes) allowing for 10 (40 bytes) of options.

"flag bits"—This group of 6 bits identify various special states in the protocol. Several of the bits may be set simultaneously.

"window size"—This is translated from the amount of space that the receiver host has available for the storage of unacknowledged data. The units are bytes unless the window scale factor option is used. The maximum value is 65535.

"checksum"—This covers both the header and the data. It is calculated by prepending a pseudo-header to the TCP packet, this consists of three 32-bit words, which contain the source, and destination IP addresses, a byte set to 0, a byte set to 6 (the protocol number for TCP in an IP datagram header) and the packet length (in "words").

"urgent pointer"—This is part of TCP's mechanism for sending urgent data that will overtake the normal data stream.

"options" 607—There are a number of options defined in various RFCs. The most useful is the Maximum Segment Size (MSS) specification facility. In accordance with the preferred embodiment, options 607 may contain a Multiple TCP Payload option 608 as explained below.

FIG. 7A shows the packet format of a TCP selective acknowledgment. The TCP selective acknowledgment option is described in detail in RFC 2018, which is incorporated herein by reference in its entirety. TCP selective acknowledge frame 722 comprises a media header 724, a protocol header 726, a received sequence number field 728, and a send sequence number field 730. The media header 724 will be particular to the type of network, e.g., Ethernet header for an Ethernet network, etc. Protocol header 726 will depend on the transport and network layer protocol used, such as TCP/IP, IPX/SPX, Netbios, etc. The received sequence number field 728 provides an identifier to the last sequence number reliably received by the computer. The send sequence number 730 corresponds to the relative sequential number of the message.

Option field 732 indicates the SACK option has been selected. Field 734 indicates an address for the left edge of the first block being selectively acknowledged and field 736 indicates an address for the right edge of the first block being selectively acknowledged. Field 738 indicates the address of the left edge of the nth block being selectively acknowledged and field 740 indicates the right edge of the nth block being selectively acknowledged, where "n" can be any integer number. In typical embodiments, a selective acknowledgement will only selectively acknowledge up to three blocks of packets.

When a client detects that certain data packets are missing from the data transmission stream, the client will request that the server retransmit the missing packet or packets by sending the selective acknowledgement 722. In response, the server will retransmit the missing packets in the TCP retransmission frame 744, as seen in FIG. 7B. TCP retransmission frame 744 comprises a number of fields as follows. Media header 746 is appropriate for the particular network, for example, an Ethernet header for an Ethernet network. Protocol header #1 in field 746 is the TCP header for a contiguous set of data contained in payload #1 in field 750. Protocol header #2 in field 752 contains a second TCP header for a contiguous set of packets contained in payload #2 in field 754. TCP retransmission frame 744 can contain any number of additional protocol header and payload pairs as indicated by protocol header #n in field 756 and payload #n in field 758. The protocol headers 748, 752, 756 will depend on the transport and network layer protocols used, such as TCP/IP, IPX/SPX, Netbios, etc.

A TCP option 607 (FIG. 6A) in each of the protocol headers 748, 752, 756 will contain the byte offset to the next segment header within TCP retransmission frame 744. Thus, the length of each TCP segment within the frame can be computed by the receiver by subtracting the current offset of a given protocol header from the offset of the next TCP header within the frame. As is standard for a TCP send or retry frame, the length field in the media header 746 will identify only the first TCP segment by specifying the offset to protocol header #1. In this way, the receiver will retrieve the payload #1 in field 750 in accordance with protocol header #1 in field 748. A receiver that doesn't recognize the Multiple TCP Payload option of the preferred embodiment for carrying multiple segments in the TCP retransmission frame will treat the frame as containing a single segment and simply not look at the subsequent TCP segments contained in the frame. This permits the present invention to be interoperable with receivers that don't support this enhancement. For those receivers supporting this feature, the TCP header 600 will be read for an option 607 indicating the offset to the next protocol header in the frame.

In accordance with a preferred embodiment, a receiver supporting the feature will retrieve payload #1 and then check option 607 in protocol header #1 for the multiple TCP payload option 608. Multiple TCP payload option 608 in protocol header #1 will contain the offset to protocol header #2 in field 752. The receiver will then extract payload #2 in field 754 in accordance with protocol header #2 in field 752. The receiver then checks protocol header #2 for the multiple TCP payload option 608 to extract an offset to the next protocol header. The receiver continues this process until it retrieves the payload #n in field 758 in accordance with protocol header #n in field 756. Because protocol header "n" in field 756 is the last payload, it will not contain a multiple TCP payload option 608. This indicates to the receiver that the entire TCP retransmission frame 744 has been received.

Figure 8A:
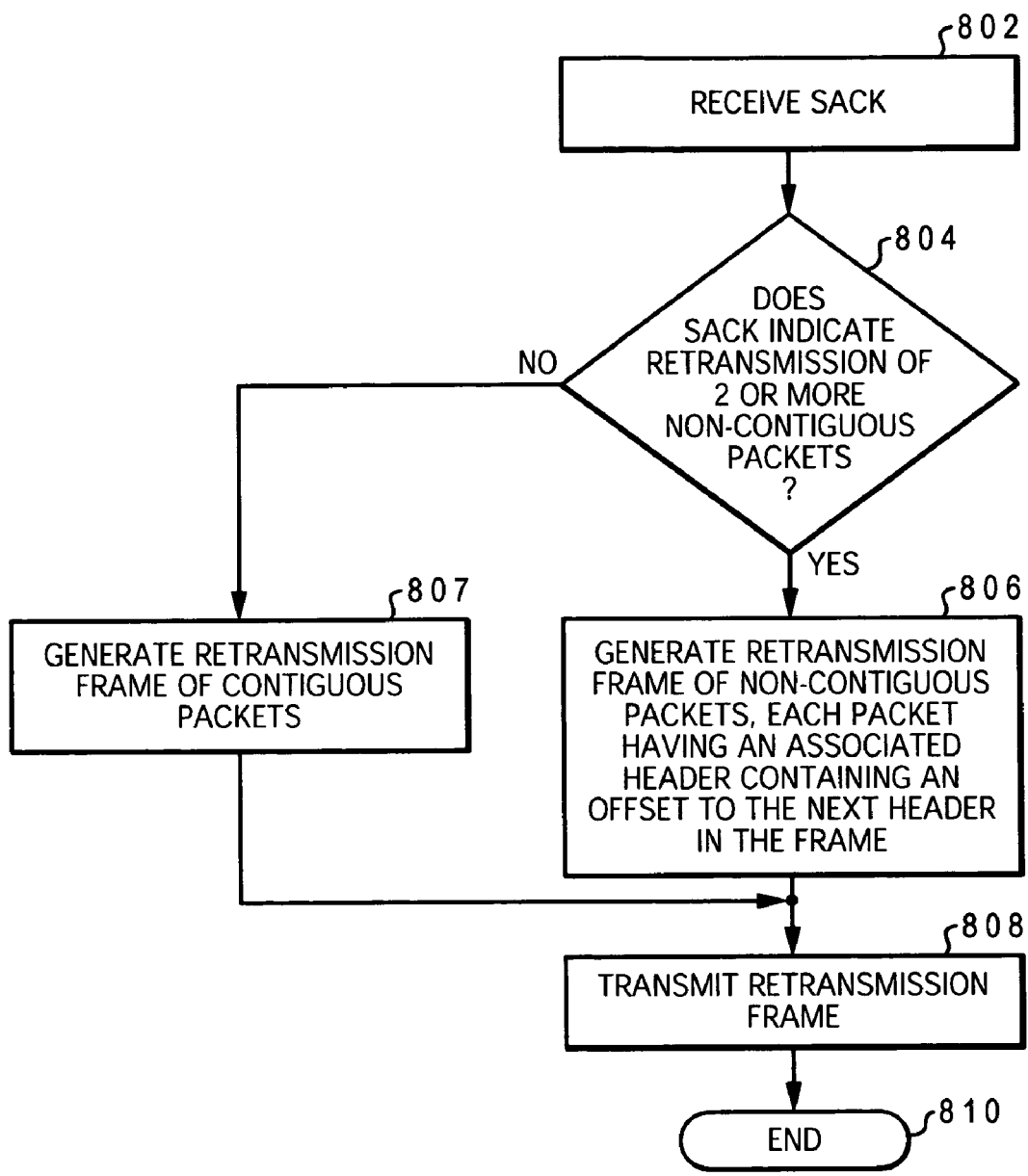
FIG. 8A shows a flow diagram of a process for generating a retransmission frame, in accordance with a preferred embodiment of the present invention.

With reference now to FIG. 8A there is shown a flow diagram of a process for generating a retransmission frame, in accordance with a preferred embodiment of the present invention. Process 800 begins when a selective acknowledgement (SACK) is received by a server 104 (step 802). Server 104 then determines which packets of the sent packets are not being acknowledged by the SACK and whether the missing packets are non-contiguous in sequence (step 804). If the missing packets are contiguous, the TCP layer 426 (FIG. 4) generates a retransmission frame containing a single TCP header and TCP segment of the contiguous packets (step 807). The frame is then passed to IP layer 430 (FIG. 4) to be packetized in an IP packet, and thereafter transmitted over the network 108 to the client 106 (step 808). Thereafter, the process ends at step 810.

Returning to decision block 804 of process 800, if the received SACK indicates that 2 or more non-contiguous packets are missing from the transmission stream, server 104 generates a retransmission frame 744 at TCP layer 426 containing the missing non-contiguous packets communicated by the received SACK (step 806). The generated retransmission frame contains a TCP header for each packet being transmitted, where each TCP header contains a multiple TCP payloads option specifying an offset to the next sequential TCP header within the frame. Thereafter, TCP layer 426 transfers the TCP packet to IP layer 430 for packetization into an IP packet and transmission over the network 108 following appropriate processing at the data link layer and physical layers (step 808). Thereafter, the process ends at step 810.

Figure 8B:
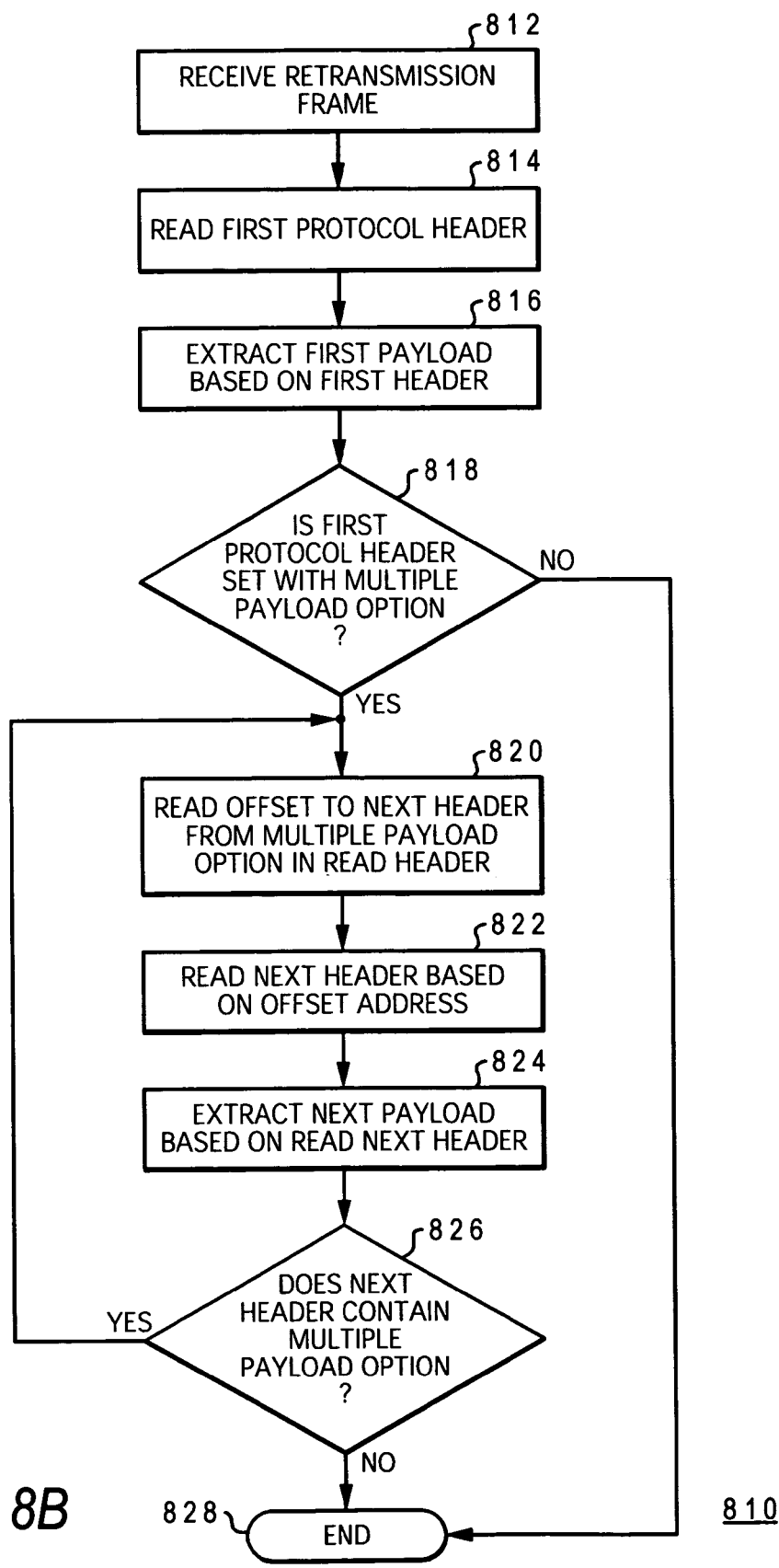
FIG. 8B shows a flow diagram of the process of extracting data from a TCP retransmission frame, in accordance with a preferred embodiment of the present invention.

With reference now to FIG. 8B, there is shown a flow diagram of the process of extracting data from a TCP retransmission frame, in accordance with a preferred embodiment of the present invention. The process begins when the client 106 receives a retransmission frame (step 812). Following appropriate processing by the Ethernet driver 452 and stripping of the IP headers by IP layer 428, TCP layer 422 reads the first TCP header within the received retransmission frame (step 814) and extracts the first payload from the TCP packet based on the information in the first TCP header (step 816). Thereafter, client 106 determines determines if the first protocol header is set with the multiple payload option (step 818). If not, the process ends at step 828. If so, the offset stored in the multiple payload option is read to determine the byte location of the next header in the retransmission frame (step 820). Client 106 reads the next header based on this offset address (step 822) and extracts the next payload in the retransmission frame based in the read header (step 824). Client 106 then determines if the header read at step 822 contains a multiple payload option (step 826). If not, the process ends at step 828, and if so, the process returns to step 820 to read the offset in the multiple payload option specifying the byte location of the next header within the retransmission frame.

Figure 9A:
FIG. 9A shows a series of contiguous packets A1-A4 transmitted from a sender to a receiver.
Figure 9B:
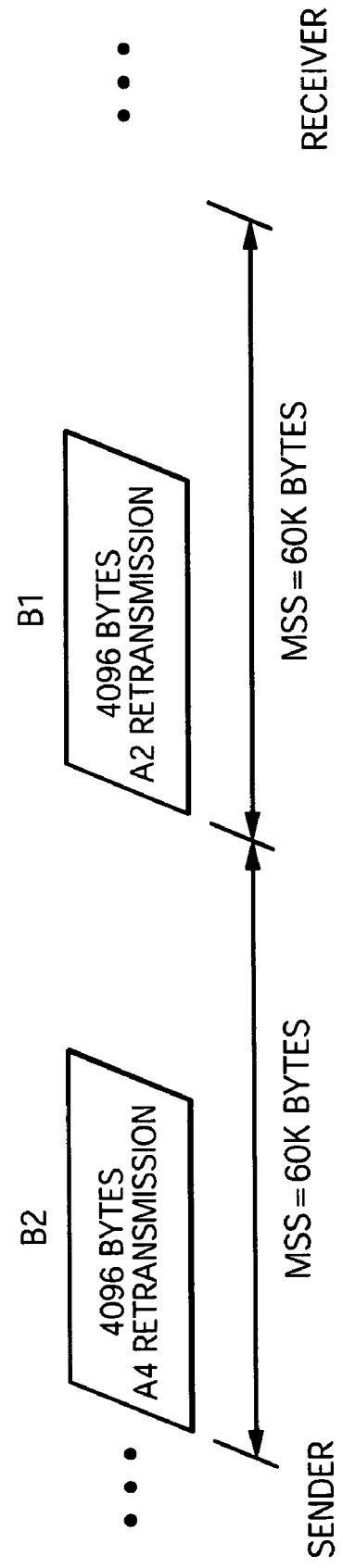
FIG. 9B shows a prior art retransmission data stream between a sender and receiver in to the receiver's SACK.

As will now be appreciated, utilization of the multiple TCP payload retransmission frame presented by the preferred embodiment provides a number of significant advantages. First, the number of packets in the network is significantly reduced by permitting a single retransmission frame to retransmit up to the MSS in a single frame, instead of transmitting multiple frames to transmit the non-contiguous missing packets. As an example, a single TCP retransmission frame 744 representing one IP packet of around 60 K bytes could replace up to 15 packets of approximately 4 K bytes needed in the prior art, as seen in FIG. 9B. As will be further appreciated, by permitting the processing to be performed just once for many TCP segments being downloaded, there results a substantial reduction in IP packet handling by the routers and packet processing at the IP and TCP layers by the receiving system. Essentially, IP level processing and the TCP level lookup for a connection or socket based on the 4-tuple would only be performed once, instead of 15 times in the prior art example above.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. A method for practicing the invention may result from combining one or more machine-readable storage devices containing the code with appropriate standard computer hardware to execute the code. An apparatus for practicing the invention could be one or more computers and storage systems containing or having network access to computer program(s) coded in accordance with the invention.

What is claimed is:

1. A method for retransmitting missing packets in a data communication comprising:
   receiving an acknowledgement message from a receiver indicating two or more packets within the data communication were not received, wherein the two or more packets are non-contiguous in sequence within the data communication, wherein the acknowledgement message is a selective acknowledgment, wherein the data communication complies with TCP;
   generating a retransmission message to retransmit the two or more packets within the data communication indicated in the message as not received, wherein the retransmission message contains the two or more packets and two or more protocol headers, and each of the two or more protocol headers is associated with a corresponding one of the two or more packets, and wherein the two or more protocol headers are the same protocol;
   wherein the retransmission message contains an option indicating it contains multiple TCP payloads;
   wherein at least one of the two or more protocol headers contains a number indicating the location of another of the two or more protocol headers in the retransmission message; and
   wherein the two or more protocol headers are transport layer headers.

2. A system for retransmitting missing packets in a data communication comprising:
   means for receiving an acknowledgement message from a receiver indicating two or more packets within the data communication were not received, wherein the two or more packets are non-contiguous in sequence within the data communication, wherein the acknowledgement message is a selective acknowledgment, wherein the data communication complies with TCP;
   means for generating a retransmission message to retransmit the two or more packets within the data communication indicated in the message as not received, wherein the retransmission message contains the two or more packets and two or more protocol headers, and each of the two or more protocol headers is associated with a corresponding one of the two or more packets, and wherein the two or more protocol headers are the same protocol;
   wherein the retransmission message contains an option indicating it contains multiple TCP payloads;
   wherein at least one of the two or more protocol headers contains a number indicating the location of another of the two or more protocol headers in the retransmission message; and wherein the two or more protocol headers are transport layer headers.

3. An article of manufacture comprising machine-readable medium including program logic embedded therein for retransmitting missing packets in a data communication that causes control circuitry in a data processing system to perform the steps of:
   receiving an acknowledgement message from a receiver indicating two or more packets within the data communication were not received, wherein the two or more packets are non-contiguous in sequence within the data communication, wherein the acknowledgement message is a selective acknowledgment, wherein the data communication complies with TCP;
   generating a retransmission message to retransmit the two or more packets within the data communication indicated in the message as not received, wherein the retransmission message contains the two or more packets and two or more protocol headers, and each of the two or more protocol headers is associated with a corresponding one of the two or more packets, and wherein the two or more protocol headers are the same protocol;
   wherein the retransmission message contains an option indicating it contains multiple TCP payloads;
   wherein at least one of the two or more protocol headers contains a number indicating the location of another of the two or more protocol headers in the retransmission message; and
   wherein the two or more protocol headers are transport layer headers.

4. A method for receiving missing packets in a data communication comprising:
   receiving a retransmission message from a sender containing two or more packets within the data communication previously indicated as not received, wherein the two or more packets are non-contiguous in sequence within the data communication, wherein the data communication complies with TCP;
   determining if the retransmission message contains the two or more packets and two or more protocol headers, wherein each of the two or more protocol headers is associated with a corresponding one of the two or more packets, and wherein the two or more protocol headers are the same protocol;
   wherein the retransmission message contains an option indicating it contains multiple TCP payloads and wherein the retransmission message is determined to contain the two or more packets and two or more protocol headers based on the option, wherein the first protocol headers contains a number indicating the location of the second protocol header in the retransmission message, and wherein the two or more protocol headers are transport layer headers, extracting a first packet of the two or more packets in accordance with its corresponding protocol header;

extracting a second packet of the two or more packets in accordance with its corresponding protocol header.

5. A system for receiving missing packets in a data communication comprising:

means for receiving a retransmission message from a sender containing two or more packets within the data communication previously indicated as not received, wherein the two or more packets are non-contiguous in sequence within the data communication, wherein the data communication complies with TCP;

means for determining if the retransmission message contains the two or more packets and two or more protocol headers, wherein each of the two or more protocol headers is associated with a corresponding one of the two or more packets, and wherein the two or more protocol headers are the same protocol, wherein the retransmission message contains an option indicating it contains multiple TCP payloads and wherein the retransmission message is determined to contain the two or more packets and two or more protocol headers based on the option, wherein the first protocol headers contains a number indicating the location of the second protocol header in the retransmission message, and wherein the two or more protocol headers are transport layer headers, means for extracting a first packet of the two or more packets in accordance with its corresponding protocol header;

means for extracting a second packet of the two or more packets in accordance with its corresponding protocol header.

6. An article of manufacture comprising machine-readable medium including program logic embedded therein for receiving missing packets in a data communication that causes control circuitry in a data processing system to perform the steps of:

receiving a retransmission message from a sender containing two or more packets within the data communication previously indicated as not received, wherein the two or more packets are non-contiguous in sequence within the data communication, wherein the data communication complies with TCP;

determining if the retransmission message contains the two or more packets and two or more protocol headers, wherein each of the two or more protocol headers is associated with a corresponding one of the two or more packets, and wherein the two or more protocol headers are the same protocol, wherein the retransmission message contains an option indicating it contains multiple TCP payloads and wherein the retransmission message is determined to contain the two or more packets and two or more protocol headers based on the option, wherein the first protocol headers contains a number indicating the location of the second protocol header in the retransmission message: and wherein the two or more protocol headers are transport layer headers, extracting a first packet of the two or more packets in accordance with its corresponding protocol header;

extracting a second packet of the two or more packets in accordance with its corresponding protocol header.

* * * * *